United States Patent
Kinney et al.

(10) Patent No.: US 7,934,732 B1
(45) Date of Patent: May 3, 2011

(54) KNUCKLE DUST CAP FOR VEHICLE SUSPENSION SYSTEM

(75) Inventors: Michael J. Kinney, Commerce Township, MI (US); Karthik Radhakrishnan, Westland, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 12/622,646

(22) Filed: Nov. 20, 2009

(51) Int. Cl.
*B62D 7/18* (2006.01)

(52) U.S. Cl. .............. 280/93.512; 277/635; 301/105.1

(58) Field of Classification Search .......... 277/634, 277/635, 636; 280/93.512; 301/37.31, 37.36, 301/37.6, 105.1, 108.1; 403/308; 411/372.5, 411/372.6, 373, 377; 138/89, 89.4, 90
See application file for complete search history.

(56) References Cited

U.S. PATENT DOCUMENTS

| | | | | |
|---|---|---|---|---|
| 1,887,611 A | * | 11/1932 | Wittenberg | ............... 220/787 |
| 2,898,153 A | * | 8/1959 | Lyon | .............. 301/37.36 |
| 4,179,167 A | * | 12/1979 | Lura et al. | ................. 384/512 |
| 5,852,361 A | * | 12/1998 | Ouchi et al. | ............. 324/174 |
| 6,588,935 B1 | | 7/2003 | Tajima et al. | |
| 6,883,816 B2 | * | 4/2005 | Baker et al. | ........ 280/93.512 |
| 7,686,313 B2 | * | 3/2010 | Folger et al. | ........ 280/93.512 |
| 2007/0257664 A1 | * | 11/2007 | Folger et al. | ............ 324/160 |

OTHER PUBLICATIONS

TRW Photograph showing the front corner assembly from a 1997 BMW 528.

\* cited by examiner

*Primary Examiner* — Eric Culbreth
*Assistant Examiner* — Joseph Rocca
(74) *Attorney, Agent, or Firm* — MacMillan, Sobanski & Todd, LLC

(57) ABSTRACT

A knuckle for a vehicle suspension system interconnects portions of a vehicle steering system, a vehicle brake, and a vehicle suspension system, and includes a knuckle body having a hub and bearing opening formed through the body. The hub and bearing opening define a substantially cylindrical inner wall. A cap is disposed within the hub and bearing opening. A recess is formed in the inner wall of the hub and bearing opening, and the cap includes a radially outwardly extending anti-rotation member disposed within the recess.

15 Claims, 7 Drawing Sheets

KNUCKLE DUST CAP FOR VEHICLE SUSPENSION SYSTEM

BACKGROUND

Various embodiments of a knuckle for a vehicle suspension system are described herein. In particular, the embodiments described herein relate to an improved dust cap for a knuckle for a vehicle suspension system.

It is known to provide a suspension for a steerable road wheel of a vehicle comprising a steerable knuckle rotatable about a steering axis to allow steering of the wheel. During vehicle operation, the various surfaces of the knuckle and the vehicle components attached thereto may be exposed to the environment, such as stone impingement, water, and dirt or dust.

SUMMARY

The present application describes various embodiments of a knuckle for a vehicle suspension system which interconnects portions of a vehicle steering system, a vehicle brake, and a vehicle suspension system. One embodiment of the knuckle includes a knuckle body having a hub and bearing opening formed through the body. The hub and bearing opening define a substantially cylindrical inner wall. A cap is disposed within the hub and bearing opening. A recess is formed in the inner wall of the hub and bearing opening, and the cap includes a radially outwardly extending anti-rotation member disposed within the recess.

In another embodiment, a knuckle for a vehicle suspension system interconnects portions of a vehicle steering system, a vehicle brake, and a vehicle suspension system, and includes a knuckle body having a hub and bearing opening formed through the body. The hub and bearing opening define a substantially cylindrical inner wall. A cap is disposed within the hub and bearing opening, and installed to prevent rotation of the cap after assembly of the knuckle.

In another embodiment, a knuckle for a vehicle suspension system interconnects portions of a vehicle steering system, a vehicle brake, and a vehicle suspension system. A cap for closing a hub and bearing opening formed in the knuckle includes a substantially cylindrical side wall having a longitudinal axis, a closed end, and an open end.

Other advantages of the knuckle for a vehicle suspension system will become apparent to those skilled in the art from the following detailed description, when read in light of the accompanying drawings.

DETAILED DESCRIPTION

Figure 1:
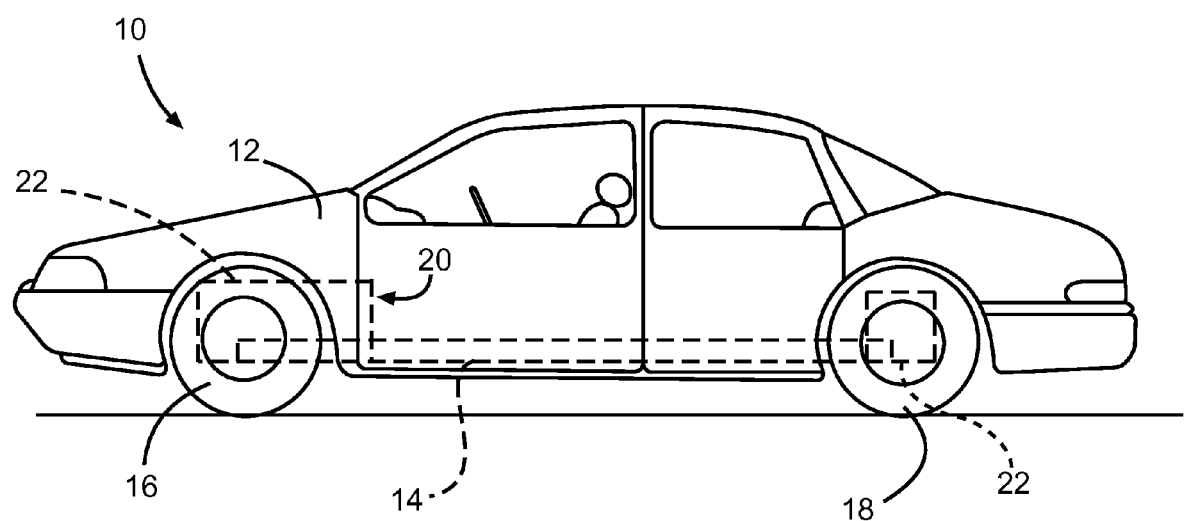
FIG. 1 is a schematic illustration of a vehicle having a suspension system.

A vehicle 10 is illustrated in FIG. 1. The vehicle 10 includes a body 12 mounted to a frame, shown schematically at 14. The frame 14 is connected to front and rear wheels 16 and 18, respectively, by a vehicle suspension system. The vehicle suspension system is shown schematically generally at 20.

In the illustrated embodiment each of the front wheels 16 is connected to the frame 14 and body 12 by a wheel suspension assembly, shown schematically at 22. The wheel suspension assembly 22 includes a knuckle 30, shown in FIGS. 2, 3, and 8, structured and configured for connection with a plurality of vehicle components as described below. The illustrated knuckle 30 is further structured and configured for use with the front driver side or left side vehicle wheel. Although not illustrated, it will be understood that a knuckle structured and configured for use with the front right vehicle wheel 16 may be substantially identical to the knuckle 30, but formed as a mirror image of the knuckle 30.

Figure 2:
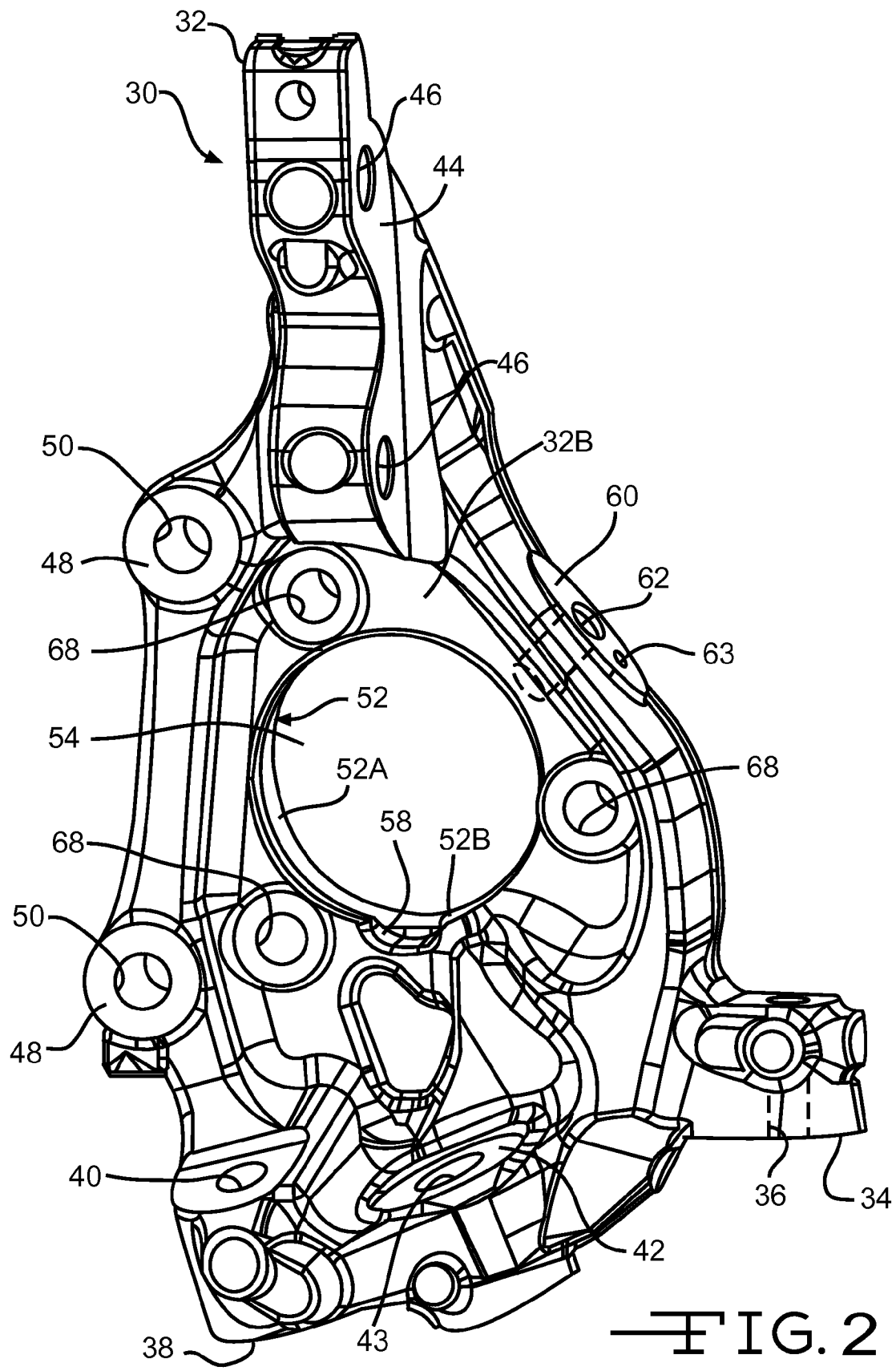
FIG. 2 is a perspective view of the inboard side of knuckle used in the suspension system illustrated in FIG. 1.
Figure 3:
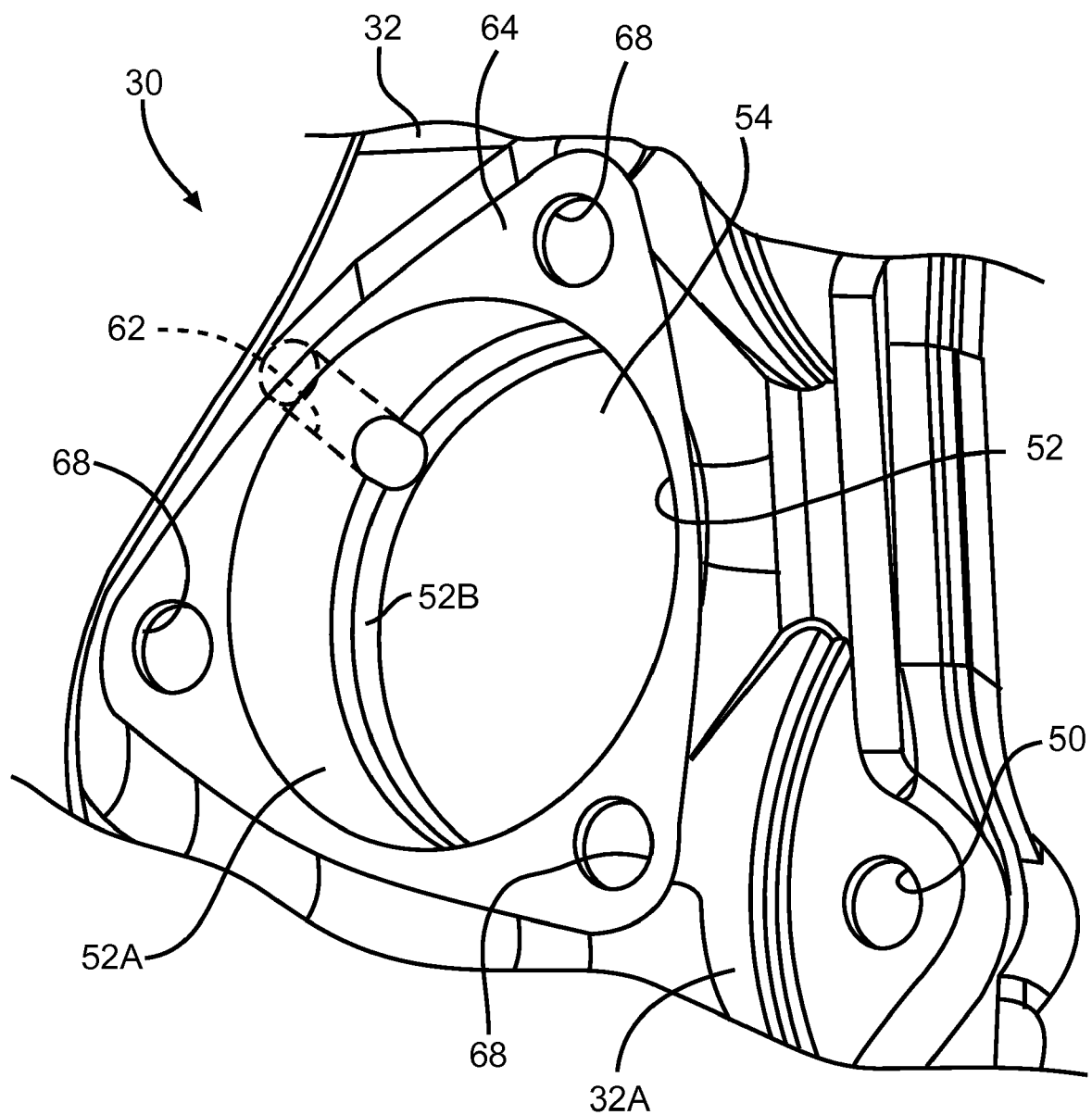
FIG. 3 is a perspective view of a portion of the outboard side of knuckle used illustrated in FIGS. 1 and 2.

The knuckle 30 includes a knuckle body 32 having an outboard side 32A, best shown in FIG. 3, and an inboard side 32B, best shown in FIG. 2. The knuckle body 32 may be formed from any desired material such as aluminum. In the illustrated embodiment, the knuckle body 32 is formed from cast aluminum. Alternatively, the knuckle body 32 may be formed from cast iron, forged aluminum, forged steel, aluminum or steel stamped and/or welded assemblies or any combination thereof, and any other suitable metal, metal alloy, or non-metal. The knuckle 30 rotatably supports the wheel 16 within the vehicle suspension system 20.

The knuckle 30 may be formed in any desired shape to fit within the vehicle 10 within which the knuckle 30 is installed. The knuckle 30 may also have any desired number of mounting locations for the various components of the vehicle suspension system 20, steering system, and other vehicle components, as described below. For example, in the illustrated embodiment, the knuckle 30 includes a mounting surface 34 and a mounting aperture 36 for pivotally mounting a steering arm (not shown), which interconnects the knuckle 30 with a vehicle steering system (not shown). Similarly, the knuckle 30 includes a mounting surface 38 and a mounting aperture 40 for pivotally mounting a handling arm (not shown), which interconnects the knuckle 30 with a front suspension subframe/engine cradle and/or frame rail of the vehicle body. The knuckle 30 further includes a mounting surface 42 and a mounting aperture 43 for pivotally mounting a ride arm (not shown), which interconnects the knuckle 30 with vehicle body via the subframe and/or frame rail.

The knuckle 30 also includes a mounting surface 44 and mounting apertures 46 for pivotally mounting a strut or shock absorber (not shown), which interconnects the knuckle 30 with the frame 14. The illustrated knuckle 30 also includes mounting surfaces 48 and mounting apertures 50 for mounting a brake caliper (not shown), which interconnects the knuckle 30 with a vehicle brake (not shown).

The illustrated knuckle 30 includes a substantially cylindrical hub and bearing opening or pilot hole 52 formed through the knuckle 30 and defining a space 54. The pilot hole 52 is substantially cylindrical and has a first portion 52A having first inside diameter extending inward from the outboard side 32A. The pilot hole 52 further includes a second portion 52B having second inside diameter extending from the first portion 52A outward toward the inboard side 32B. In the illustrated embodiment the first inside diameter is larger than the second inside diameter. The intersection of the first portion 52A and the second portion 52B of the pilot hole 52 defines a radially inwardly extending shoulder 56, shown in FIG. 8.

Figure 5:
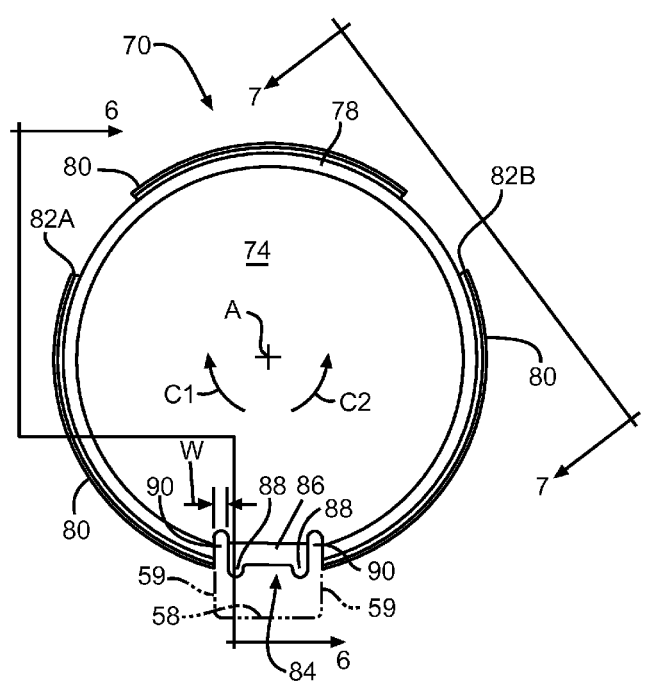
FIG. 5 is a top plan view of the knuckle dust cap illustrated in FIG. 4.
Figure 8:
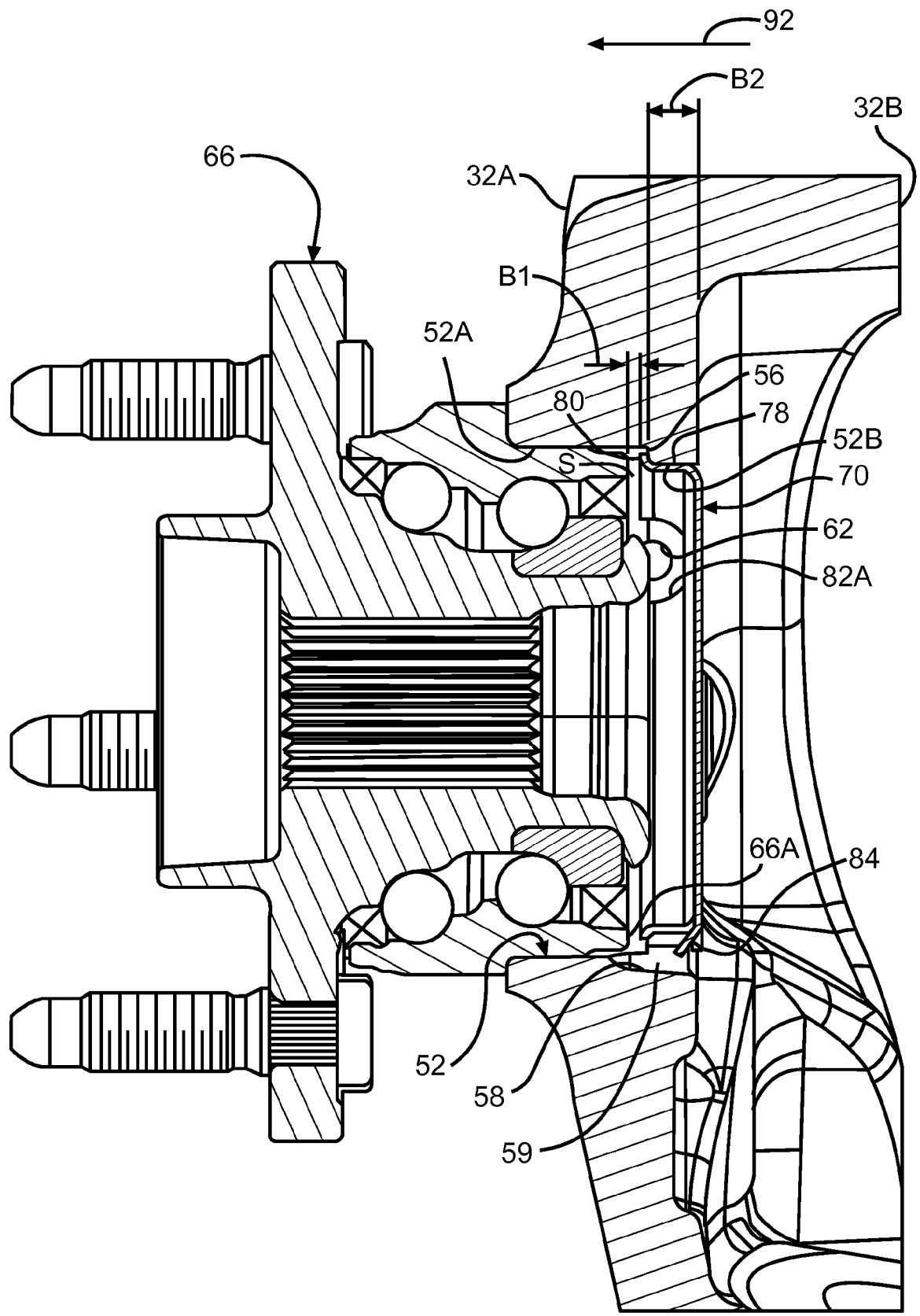
FIG. 8 is an enlarged cross-sectional view of the knuckle illustrated in FIGS. 2 and 3, showing the knuckle dust cap in the installed dust cap position.

A drainage channel 58 is formed in a portion of the second portion 52B and a portion of the first portion 52A of the pilot hole 52, as best shown in FIGS. 2 and 8, and further illustrated by phantom line in FIG. 5. The drainage channel 58 allows for drainage of water and/or dirt that may come into the space 54 during vehicle operation.

The knuckle 30 includes a mounting surface 60, a sensor aperture 62, and a mounting aperture 63 for mounting a sensor, such as an anti-lock braking system (ABS) sensor (not shown). In the illustrated embodiment, the ABS sensor would extend inwardly through the sensor aperture 62 into the space 54. A mounting surface 64 for a hub and bearing assembly, shown at 66 in FIG. 8, is formed about the pilot hole 52 in the surface of the outboard side 32A of the knuckle 30. Mounting apertures 68 are formed through the knuckle 30 from the mounting surface 64 to the inboard side 32B of the knuckle 30. In the illustrated embodiment, three mounting apertures 68 are shown. Alternatively, any other desired number of apertures may be formed for mounting the hub and bearing assembly 66.

It will be understood that the steering arm, handling arm, ride arm, strut or shock absorber, brake caliper, and hub and bearing assembly 66 may be attached or mounted to the knuckle 30 by any desired fastener or fasteners, such as threaded fasteners (not shown). Alternatively, any other mechanical fastener may be used.

Referring now to FIGS. 4 through 7, a first embodiment of a dust cap is shown generally at 70. The dust cap 70 is substantially cylindrical in shape, has an axis A, a first or closed end 72 defining a substantially planar first surface 74, and a second or open end 76. A substantially cylindrical side wall 78 extends axially between the closed end 72 and the open end 76. A circumferentially and radially outwardly extending lip 80 is formed in the side wall 78 at the open end 76.

In the illustrated embodiment, an outside diameter D1 of the side wall 78 is slightly larger than the inside diameter of the second portion 52B of the pilot hole 52. An outside diameter D2 of the lip 80 is slightly smaller than the inside diameter of the first portion 52A of the pilot hole 52, and slightly larger than the inside diameter of the second portion 52B.

Sensor openings 82A and 82B are formed in the side wall 78. The purpose of the sensor openings 82A and 82B is described below. In the embodiment of the dust cap 70 shown in FIGS. 4 through 7, an anti-rotation member 84 is formed in the side wall 78. The illustrated anti-rotation member 84 is formed during a manufacturing process, such a stamping process. In manufacturing the illustrated dust cap 70, material from the side wall 78 is removed to define the anti-rotation member 84.

Figure 4:
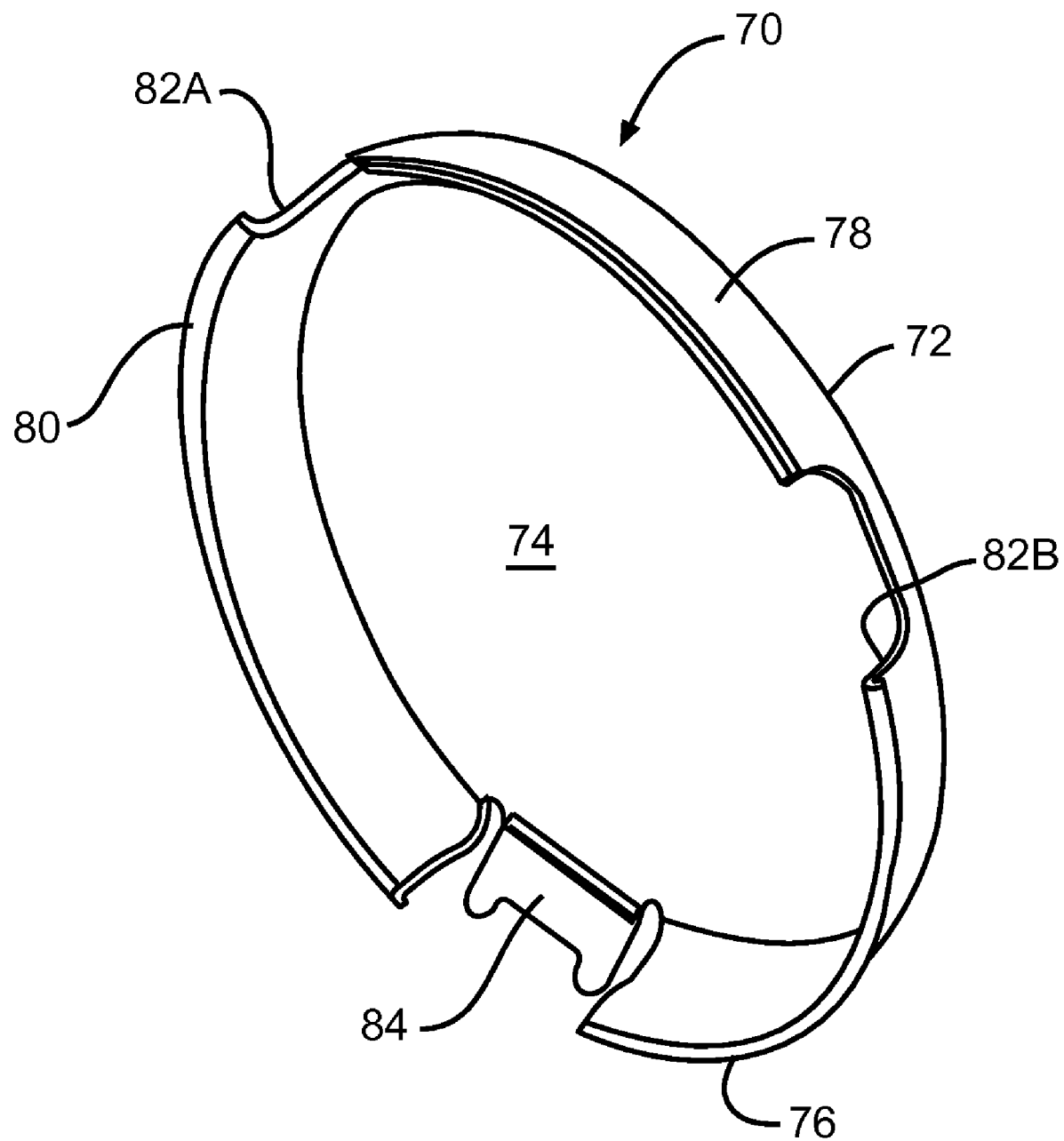
FIG. 4 is a perspective view of a knuckle dust cap according to the invention.
Figure 6:
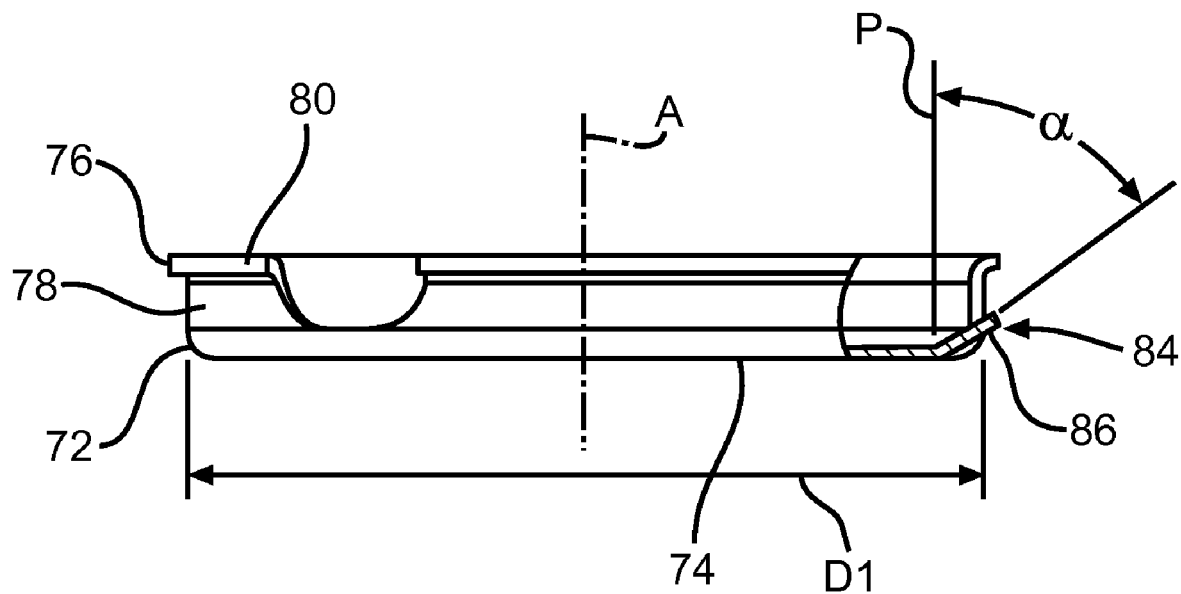
FIG. 6 is a side elevational view of the knuckle dust cap, partially in section, taken along the line 6-6 in FIG. 5.
Figure 7:
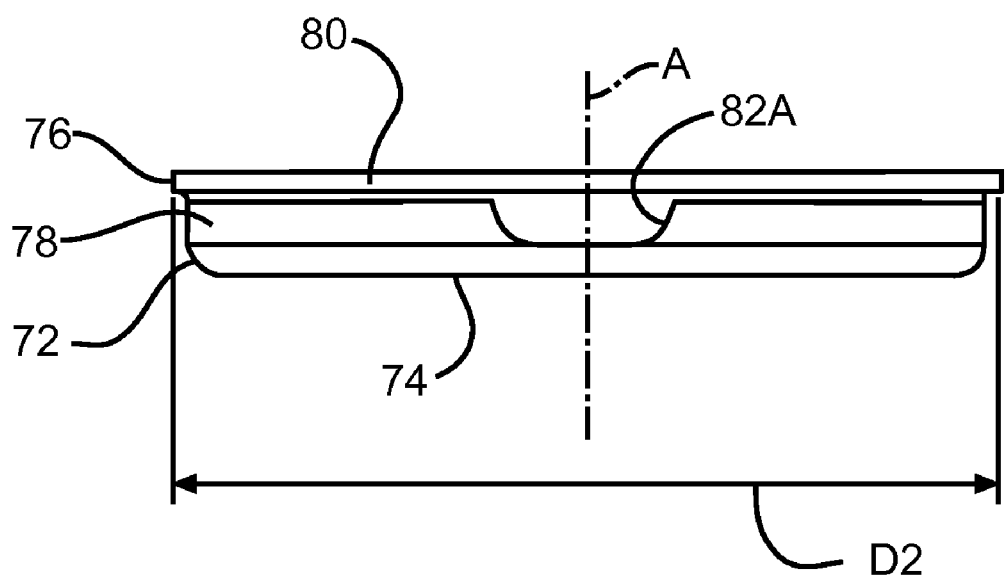
FIG. 7 is a side elevational view of the knuckle dust cap taken along the line 7-7 in FIG. 5.

The embodiment of the anti-rotation member 84 illustrated in FIGS. 4 through 6 includes a body 86 bent or formed outwardly of a plane P of the side wall 78 at an angle α of about 60 degrees. Alternatively, the body 86 of the anti-rotation member 84 may be bent or formed outwardly of the plane P of the side wall 78 at an angle α within the range of from about 30 degrees to about 80 degrees.

The body 86 of the anti-rotation member 84 may have any desired shape. In the embodiment illustrated in FIGS. 4 through 6, the body 86 includes two outwardly extending fingers 88. The body 86 is further spaced apart from the side wall 78 by gaps or slots 90.

Figure 5A:
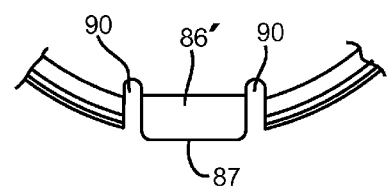
FIG. 5A is an enlarged plan view of a first alternate embodiment of the anti-rotation member illustrated in FIG. 5.
Figure 5B:
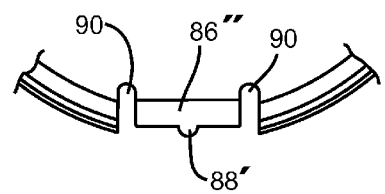
FIG. 5B is an enlarged plan view of a second alternate embodiment of the anti-rotation member illustrated in FIG. 5.

The body 86 of the anti-rotation member 84 may have any other desired shape. For example in the embodiment illustrated in FIG. 5A, the body 86' includes a substantially straight outboard edge 87 spaced apart from the side wall 78 by the slots 90. Alternatively, as shown in the embodiment illustrated in FIG. 5B, the body 86" includes one outwardly extending finger 88' also spaced apart from the side wall 78 by the slots 90.

The dust cap 70 may be formed from any desired material such as steel. In the illustrated embodiment, the dust cap 70 is formed from galvanized steel. Alternatively, the dust cap 70 may be formed from steel sheet, aluminum sheet, plastic, composite, or any other suitable metal, metal alloy, or non-metal.

Referring now to FIG. 8, the dust cap 70 is inserted into the hub and bearing pilot hole 52 from the outboard side 32A of the knuckle 30. The dust cap 70 is inserted until the lip 80 engages the shoulder 56, thereby defining an installed dust cap position. In the installed position, the anti-rotation member 84 is disposed within the drainage channel 58, and the sensor opening 82A of the dust cap 70 is aligned with the sensor aperture 62 of the knuckle 30. Because the outside diameter D1 of the side wall 78 is slightly larger than the inside diameter of the second portion 52B of the pilot hole 52, the dust cap 70 may be retained in the pilot hole 52 by an interference or press fit.

The illustrated knuckle 30 is a left-hand knuckle for use on the left side of a vehicle. A right-hand knuckle (not shown) is a substantially identical mirror image of the knuckle 30. In such a right-hand knuckle the sensor aperture opens into the side of the hub and bearing pilot hole 52 from an angle (relative to the center of the pilot hole 52) different from the angle of the aperture 62. In such a right-hand knuckle, the sensor opening 82B of the dust cap 70 will align with the sensor aperture. The dust cap 70 is therefore structured to be used in both left-hand and right-hand knuckles.

After the dust cap 70 has been inserted into the hub and bearing pilot hole 52 and moved to the installed dust cap position, the hub and bearing assembly 66 may then be inserted into the hub and bearing pilot hole 52 and mounted to the knuckle 30 with fasteners (not shown) using the mounting apertures 68.

As best shown in FIG. 8, the lip 80 of the dust cap 70 is spaced a first axial distance B1 from an inboard surface 66A of the hub and bearing assembly 66, and defines a space S between the lip 80 of the dust cap 70 and the inboard surface 66A of the hub and bearing assembly 66. The side wall 78 sealingly engages the second portion 52B of the hub and bearing pilot hole 52. When in the installed dust cap position, the side wall 78 engages the second portion 52B over a second axial distance B2. In the illustrated embodiment, the axial distance B2 is greater than the axial distance B1.

During vehicle operation, the dust cap 70 may be caused to move outboard of the hub and bearing pilot hole 52 (in the direction of the arrow 92 in FIG. 8). In the illustrated embodiment, the dust cap 70 may move outboard until the lip 80 engages the inboard surface 66A of the hub and bearing assembly 66. Because the axial distance B2 is greater than the axial distance B1, even if the lip 80 engages the inboard surface 66A of the hub and bearing assembly 66, the side wall 78 of the dust cap 70 remains engaged with the second portion 52B of the hub and bearing pilot hole 52 for an axial distance equal to B2-B1.

Normal vehicle operation may cause the dust cap 70 to rotate within the pilot hole 52, therefore causing the anti-rotation member 84 to move within the drainage channel 58 formed in the pilot hole 52. Advantageously, if the dust cap 70 is caused to rotate clockwise or counterclockwise relative to the pilot hole 52 (in the direction of the arrows C1 and C2, respectively when viewing FIG. 5) the fingers 88 of the anti-rotation member 84 will engage a side wall 59 of the drainage channel 58, thereby allowing only minimal rotation of the dust cap 70 within the pilot hole 52. In the illustrated embodiment, the maximum distance that the dust cap 70 may rotate in one direction, either clockwise or counterclockwise, is equal to the width W of the slot 90. If the dust cap 70 is caused to rotate first in on direction to engage a side wall 59, and then rotate in the opposite direction to engage the opposite side wall 59, the total maximum distance that the dust cap 70 may rotate may be defined as a distance equal to two times the width W of the slot 90. By significantly minimizing the rotation of the dust cap 70 within the drainage channel 58, the sensor openings 82A and 82B maintain their positions relative to the ABS sensor and the sensor aperture 62 through which the ABS sensor extends into the space 54, and damage to the ABS sensor is thereby prevented.

The principle and mode of operation of the knuckle for a vehicle suspension system have been described in its preferred embodiment. However, it should be noted that the knuckle and knuckle dust cap described herein may be practiced otherwise than as specifically illustrated and described without departing from its scope.

What is claimed is:

1. A knuckle for a vehicle suspension system, the knuckle interconnecting portions of a vehicle steering system, a vehicle brake, and a vehicle suspension system, the knuckle comprising:
   a knuckle body having a hub and bearing opening formed through the body, the hub and bearing opening defining a substantially cylindrical inner wall; and
   a cap disposed within the hub and bearing opening;
   wherein a recess is formed in the inner wall of the hub and bearing opening; and
   wherein the cap includes a radially outwardly extending anti-rotation member disposed within the recess;
   wherein the hub and bearing opening is substantially cylindrical and includes a first portion having a first inside diameter, a second portion having a second inside diameter smaller than the first inside diameter, wherein an intersection of the first and second portions define a radially inwardly extending shoulder;
   wherein the cap is substantially cylindrical in shape having a longitudinal axis and the cap further has a closed end, an open end, and a substantially cylindrical side wall extending axially between the closed end and the open end, wherein when the cap is disposed within the hub and bearing opening, an outer surface of the cap side wall sealingly engages the second portion of the hub and bearing opening; and
   wherein a circumferentially and radially outwardly extending lip is formed at the open end of the cap side wall, wherein when disposed within the hub and bearing opening, the lip engages the shoulder of the hub and bearing opening.

2. The knuckle according to claim 1, wherein the recess defines an anti-rotation recess.

3. The knuckle according to claim 1, wherein a portion of the cap side wall extends radially outwardly of the cap side wall and defines the anti-rotation member; and wherein the anti-rotation member is disposed within the recess such that when, during operation of a vehicle in which the knuckle is installed, the cap begins to rotate within the hub and bearing opening, the anti-rotation member will engage a wall of the recess, thereby stopping rotation of the cap.

4. The knuckle according to claim 1, wherein the side wall of the cap includes at least one sensor opening formed therein.

5. The knuckle according to claim 1, wherein the anti-rotation member includes at least one outwardly extending finger.

6. The knuckle according to claim 1, wherein the anti-rotation member includes at least one finger spaced apart from the side wall by slots.

7. A knuckle for a vehicle suspension system, the knuckle interconnecting portions of a vehicle steering system, a vehicle brake, and a vehicle suspension system, the knuckle comprising:
   a knuckle body having a hub and bearing opening formed through the body, the hub and bearing opening defining a substantially cylindrical inner wall; and
   a cap disposed within the hub and bearing opening;
   wherein the cap is installed to prevent rotation of the cap after assembly of the knuckle;
   wherein the cap is substantially cylindrical in shape having a longitudinal axis and an axially extending side wall, wherein when disposed within the hub and bearing opening, an outer surface of the cap side wall sealingly engages an inside surface of the hub and bearing opening, wherein a portion of the cap side wall extends radially outwardly of the cap side wall and defines an anti-rotation member;
   wherein when during operation of a vehicle in which the knuckle is installed, the cap begins to rotate within the hub and bearing opening, the anti-rotation member will engage a portion of an inner wall of the hub and bearing opening, thereby stopping rotation of the cap;
   wherein the hub and bearing opening is substantially cylindrical and includes a first portion having a first inside diameter, a second portion having a second inside diameter smaller than the first inside diameter, wherein an intersection of the first and second portions define a radially inwardly extending shoulder;
   wherein the cap further has a closed end, an open end, and a substantially cylindrical side wall extending axially between the closed end and the open end, wherein when disposed within the hub and bearing opening, an outer surface of the cap side wall sealingly engages the second portion of the hub and bearing opening; and
   wherein a circumferentially and radially outwardly extending lip is formed at the open end of the side wall, wherein when disposed within the hub and bearing opening, the lip engages the shoulder of the hub and bearing opening.

8. The knuckle according to claim 7, wherein the side wall of the cap includes at least one sensor opening formed therein.

9. The knuckle according to claim 7, wherein the anti-rotation member includes at least one outwardly extending finger.

10. The knuckle according to claim 7, wherein the anti-rotation member includes at least one finger spaced apart from the side wall by slots.

11. A knuckle for a vehicle suspension system comprising:
    a knuckle having a hub and bearing opening and defining an inner wall having a recess formed therein, the hub and bearing opening including a first portion having a first inside diameter, a second portion having a second inside diameter smaller than the first inside diameter, wherein an intersection of the first and second portions defining a radially inwardly extending shoulder; and a cap disposed within the hub and bearing opening, the cap having a closed end, an open end, a side wall extending between the closed end and the open end, and an anti-rotation member, wherein a radially outwardly extending lip is formed at the open end of the side wall of the cap, wherein when the cap is disposed within the hub and bearing opening, the anti-rotation member is disposed in the recess, an outer surface of the cap side wall engages the second portion of the hub and bearing opening, and the lip of the cap engages the shoulder of the hub and bearing opening.

12. The knuckle according to claim 11, wherein a portion of the cap side wall extends radially outwardly of the cap side wall and defines the anti-rotation member; and wherein the anti-rotation member is disposed within the recess such that when, during operation of a vehicle in which the knuckle is installed, the cap begins to rotate within the hub and bearing opening, the anti-rotation member will engage a wall of the recess, thereby stopping rotation of the cap.

13. The knuckle according to claim 12, wherein the side wall of the cap includes at least one sensor opening formed therein.

14. The knuckle according to claim 12, wherein the anti-rotation member includes at least one outwardly extending finger.

15. The knuckle according to claim 12, wherein the anti-rotation member includes at least one finger spaced apart from the side wall by slots.

* * * * *